United States Patent
Rowley

(10) Patent No.: US 6,287,501 B1
(45) Date of Patent: Sep. 11, 2001

(54) METHOD FOR MANUFACTURING CROSSLINKED OVERMOLDED PLUMBING TUBES

(76) Inventor: William W. Rowley, 35 Wilding Chase, Chagrin Falls, OH (US) 44022

( * ) Notice: Subject to any disclaimer, the term of this patent is extended or adjusted under 35 U.S.C. 154(b) by 0 days.

(21) Appl. No.: 09/293,861

(22) Filed: Apr. 16, 1999

Related U.S. Application Data

(62) Division of application No. 08/827,305, filed on Mar. 28, 1997, now Pat. No. 5,895,695.

(51) Int. Cl.⁷ .............................. B29B 13/00; B28B 7/00
(52) U.S. Cl. ...................... 264/254; 264/271.1; 264/296
(58) Field of Search .............................. 428/36.9, 36.91; 264/254, 259, 271.1, 296, 513, 533, 537, 320, 322

(56) References Cited

U.S. PATENT DOCUMENTS

| | | |
|---|---|---|
| 4,803,033 | 2/1989 | Rowley . |
| 5,527,503 | 6/1996 | Rowley . |
| 5,895,695 * | 4/1999 | Rowley .............................. 428/36.9 |
| 5,916,647 * | 6/1999 | Weinstein ............................ 428/36.9 |
| 6,082,780 * | 7/2000 | Rowley et al. .................... 264/271.1 |

* cited by examiner

*Primary Examiner*—Rena L. Dye
(74) *Attorney, Agent, or Firm*—Buckingham, Doolittle & Burroughs, LLP

(57) ABSTRACT

A process is disclosed for overmolding crosslinked tubing ends onto a crosslinkable tube. The tube, made of a first polymer, has an inner diameter. The tube is inserted at least partially into a mold and at least partially onto a cylindrical mandrel having a base and a tip. The mandrel has an outer diameter dimensioned to allow the inner diameter of the tube to slide thereon. The mold contains a void for injection of a second polymer. The void co-acts with the mandrel and the tube to define an overmolding shape. After injection molding the second polymer over the tube and the mandrel in the void of the mold, the first and second polymers are crosslinked. Different embodiments of the overmolding shape are taught.

40 Claims, 3 Drawing Sheets

METHOD FOR MANUFACTURING CROSSLINKED OVERMOLDED PLUMBING TUBES

This application is a divisional of application Ser. No. 08/827,305 filed Mar. 28, 1997, and now which is U.S. Pat. No. 5,895,695 issue on Apr. 20, 1999.

TECHNICAL FIELD

The invention described herein pertains generally to a crosslinked plumbing tube which has at least one overmolded end (e.g., nose cone, threaded fastener or nut) attached thereto. In one aspect of this invention, the tube is more rigid than the overmolded component while in another aspect of the invention, the tube is more flexible than the overmolded component, although there are instances wherein the rigidity of both the tube and the overmolded component are essentially the same. The overmolded tube provides an all-plastic waterway for a contained liquid or gas to flow through.

BACKGROUND OF THE INVENTION

In plumbing installations, copper tubing is widely employed. In risers, used for connecting tubing to fixtures or tanks, the end of the copper tubing is shaped to form a bulb sealing surface and such bulb includes a shoulder permitting the tubing and the bulb sealing surface to be drawn into biting or sealing engagement with the fixture. The cost of such copper tubing and the cost of forming the same to permit the connection to such fixtures or tanks is substantial.

In the past, polymers such as polybutylene were used in plumbing. Tubing or pipe made of polybutylene is normally joined by heat-fusion techniques, by mechanical compression, overmolding and by cold flaring. In order to provide such polybutylene tubing with a bulb sealing surface or an end cap for such purposes, a variety of techniques were employed. Two commonly employed techniques were: (1) spin-welding a separately molded bulb onto the outer diameter (O.D.) of the end of a tube; or (2) insert molding a bulb onto the O.D. of the end of a tube. All such processes have cost and performance drawbacks. In the spin welding technique, excessive clamping pressures may cause the loaded part to become dislodged or separated from the O.D. of the tubing and the interface of the parts provides a possibility of leakage. In the case of a neoprene or like washer employed on the O.D. of the tubing, depending on the configuration of the tube/washer interface, the same leakage susceptibility is potentially present. Moreover, a flange formed to receive the washer may itself create a point of weakness if excessive clamping pressures are employed. Further neoprene washers are known to deteriorate with age and temperature exposure. Lastly, insert molding forces hot material over a cold tube surface, creating a bond that is hard to predict and control.

One solution to this problem of providing polybutylene tubing with an attached bulb sealing surface of unitary construction is detailed in U.S. Pat. Nos. 4,316,870, 4,446, 084 and 4,525,136, which are hereinby incorporated fully by reference. The thrust of these references however, is to teach the ability to maintain a constant diameter opening within the tubing. This is of necessity, due to the configuration of the mold cavity, and insertion of the mandrel inside the tubing during some of the processing steps.

After solving the sealing surface issues, the ability to bell an opposed end of the tubing, without any accompanying wall thickness compromise, which would make the product unsuitable for all plumbing applications, was addressed. Prior art solutions to the formation of a bell on one end of polybutylene tubing is by heating a portion of the end of the tubing, followed by insertion of a mandrel into the heated open end, the O.D. of the mandrel being matched to the targeted inner diameter (I.D.) of the tubing. While this approach will bell the tubing, it is incapable of reproducibly making tubing product with a constant wall thickness of 0.062"+0.010" throughout the belled end, particularly in the neck region of the bell. This is due to the fact that the bell is made by expanding the I.D. and thus thinning the walls. A solution to this problem is found in U.S. Pat. No. 5,527, 503, the teachings of which are hereinby fully incorporated by reference.

The trend today however, is to shift from thermoplastic materials, e.g., polypropylene, polybutylene, etc., to combined thermoplastic/thermoset materials, .g., crosslinked polyethylene wherein at least a portion of the polymer is crosslinked, for example approximately 65% thermoset/ 35% thermoplastic. However, this shift in materials is not simple in that there are several processing changes which must be incorporated in order to fabricate acceptable parts. Since thermosets in general, cannot be extruded like thermoplastics, differing processing conditions must be employed in different sequences in order to achieve similar functionality for the thermoset/thermoplastic product. While thermoplastic material can chemically bond to itself, as the percentage of crosslinking increases, there is less thermoplastic remaining to form this chemcial bond. Therefore, one of the keys to this invention is the recognition of the need to form overmolded ends at the earliest time when they are the least crosslinked. When crosslinking using radiation, this is before any crosslinking occurs. With silane crosslinking, this is typically after extrusion, but before crosslinking is complete. In a preferred embodiment, the tube and the overmolded plastic will both be essentially about 35% crosslinked, and subsequently permitted to complete the crosslinking process after overmolding.

However, in many plumbing applications, a need exists for a connector wherein the characteristics of the nose cone are different from those of the tube, yet still retain the leak-proof aspects of a one-piece connector. It is desirable to produce a rise tube which is rigid enough to withstand pressures in plumbing, but which has a nose cone which is less flexible than the tube which permits sealing engagement in a leak-proof manner with a fitting. Alternatively, it is also desirable to produce a riser tube which is flexible enough to permit installation in a tight geometric configuration, yet still have a nose cone which is sufficiently rigid to permit sealing engagement in leak-proof manner with a fitting. Typically, tubing rigidity and nose cone flexibility have always been properties which were antagonistic to each other. By using the technology Described in this application, it is possible to custom tailor the needs of the tubing and nose cone, which depending on the end application, may require that the rigidity of the tubing and nose cone may be essentially the same.

SUMMARY OF THE INVENTION

In accordance with the present invention, there is provided a method by which a nose cone of a first rigidity is overmolded onto a plastic tube of a second rigidity, and wherein the relationship between the first rigidity and second rigidity may be the same or different. When the rigidity is different, the relationship between the first and second rigidity can be either that the first rigidity is more flexible than the second rigidity or vice versa. One of the keys to controlling the rigidity of the respective components is the density of each part. Typically, and specially with polyethylene, the higher the density of the polymer, the more rigid the component. By controlling the density and/or possibly the degree of crosslinking of the polymer, it is possible to custom tailor the needs of the tube and the nose cone.

In another embodiment of this invention, the rigidity of the tube and the overmolded component are essentially the same, with the overmolding occurring when the tube and overmolded component, e.g., nose cone, are either non-crosslinked or crosslinked to a limited degree, followed by a continuation of the crosslinking process to a second higher degree of crosslinking. This provides the best seal between the molded and extruded surfaces.

These and other objects of this invention will be evident when viewed in light of the drawings, detailed description, and appended claims.

BRIEF DESCRIPTION OF THE DRAWING

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
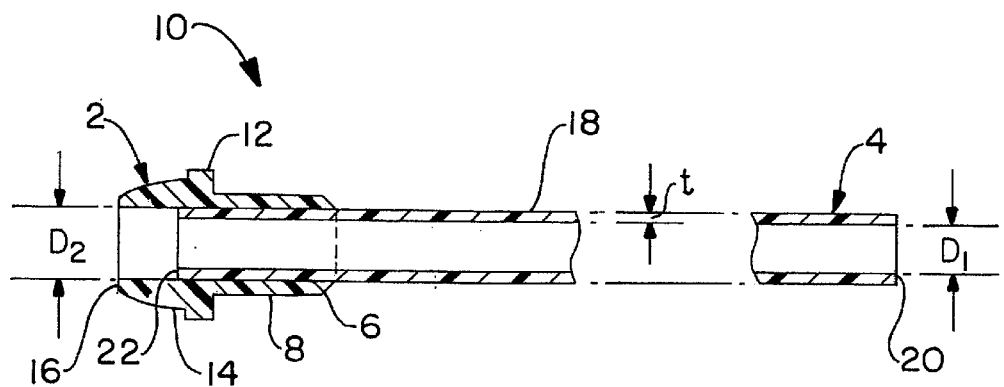
FIG. 1 is a cross-section view of a plastic tube showing one connector overmolded thereto.

Referring now to the drawings wherein the showings are for purposes of illustrating the preferred embodiment of the invention only and not for purposes of limiting the same, the Figures show cut lengths of plastic tubing which have overmolded components as well as the process used to achieve such a product.

As seen in FIG. 1, a plumbing connector 10 is shown having a plastic nose cone 2 at one end which is secured to plastic tube 18 having two opposed ends 20,22 in a leak-proof manner. Tubing segment 4, the portion of tube 18 which is not attached to nose cone 2, can be of any desired length and this dimension plays no part in the invention. The nose cone 2 will have a front face 16, and a conical or radiused sealing surface 14 which terminates at shelf 12. The inner surfaces of cylindrical rear surface 8 and radiused surface 6 are used to affix the nose cone in a leak-proof manner to the corresponding section of the outer surface of tubing segment 18. Nose cone 2 has an inner diameter $D_2$ which essentially matches the outer diameter of tube 18. The inner diameter $D_1$ of tube 18 will be smaller than that of $D_2$ by a thickness t of the tube.

The connector 10 will have its tubing segment 18 of a first rigidity and a first flexibility and a nose cone 2 of a second rigidity and a second flexibility. In one embodiment of the invention, the first rigidity will be harder than the second rigidity and the first flexibility will be less than the second flexibility, i.e., the nose cone will be "softer" and more "flexible" than the tube. In a second embodiment of this invention, the relationship will be the inverse of that described for the first embodiment, the first rigidity will be softer than the second rigidity and the first flexibility will be greater than the second flexibility, i.e., the nose cone will be "harder" and less "flexible" than the tube. This second embodiment configuration is preferred when higher pressures may be encountered in the application and when maximum flexibility of the connector is required. In yet a third embodiment of this invention, the rigidity of the nose cone and the tube will be essentially the same. In discussing the above terminology, it should be recognized that while there are no definite boundaries of the term definitions, which is important is the relative physical parameters with respect of one component to the other. In general, "soft" durometers are as low as 60 durometer Shore A and "rigid" durometers could be as high as 90 durometer Shore A. Phrased in a slightly different manner, rigid would be most similar to hard thermoset plastics whereas flexible would be most similar to rubbery thermoplastics.

Figure 2:
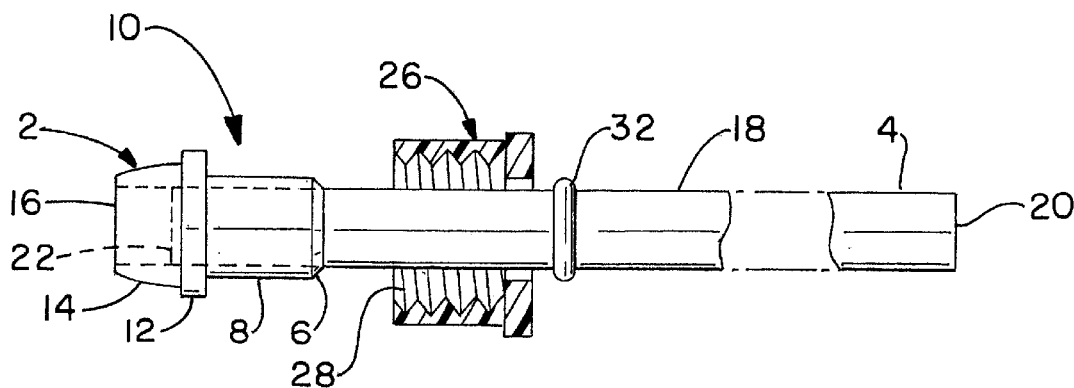
FIG. 2 is a side view of the plastic tube of FIG. 1 including a nut shown in cross-section positioned on the tube and retained in proximity to the sealing surface via protuberances on the connector.

The leak-proof engagement of nose cone 2 with tube 18 is effected by a process known to those skilled in the art as overmolding. In the first embodiment of this invention, the application which uses a rigid tube and a flexible nose cone, a low density polyethylene nose cone is molded over a high density polyethylene tube prior to the step of crosslinking. In this manner, it is possible to obtain a material to material bond, thereby effecting the leak-proof attachment of the nose cone to the tube. The resulting connector is crosslinked by means known in the art, e.g., silane crosslinking, radiation crosslinking, etc. In a variation of this process, it is possible to begin with material which is partially crosslinked before the overmolding process, followed by further crosslinking subsequent to the leak-proof attachment. The benefit of this embodiment is that the soft nose cone is a forgiving sealing surface. The application however, is generally limited to lower pressure applications in that due to the softness of the nose cone, it is possible under sufficient pressure, to have the shelf 12 and sealing surface 14 deform sufficiently to slip through nut 26, thereby prematurely disconnecting the tube from the orifice. As shown in FIG. 2, a nut 26 having a plurality of threads 28 is shown which is used to effect sealing engagement with a mating orifice. In a most preferred embodiment of the invention, the connector will have at least one ridge 32 molded into the connector to retain an appropriately sized nut.

In a more preferred embodiment of this invention, the connector will be a flexible tube and a harder, more rigid nose cone. In this embodiment, a high density glass-filled polyethylene nose cone or other molded configuration, (e.g., threaded connector or nut) is molded over a low density polyethylene tube prior to the step of crosslinking or after a limited degree of crosslinking has occurred. In this manner, it is possible to obtain a material-to-material bond, thereby effecting the leak-proof attachment of the nose cone to the tube. The resulting connector is crosslinked by means known in the art. In a variation of this process, it is possible to begin with material which is partially crosslinked before the overmolding process, followed by further crosslinking subsequent to the leak-proof attachment. The benefit of this embodiment is that the hard nose cone is suitable for higher pressure applications than possible in the first embodiment. Due to the more rigid nature of the nose cone, it is not possible for shelf 12 and sealing surface 14 to deform sufficiently to slip through nut 26, thereby prematurely disconnecting the tube from the orifice. In addition, due to the flexible nature of the tube, it is possible to twist the tube to conform to an irregular pathway, without having the tube inner diameter $D_1$, decreased due to kinking of the tube.

The preferred polymer in this invention is polyethylene. The main features which influence the properties of polyethylene are (1) the degree of branching in the polymer; (2) the average molecular weight; and (3) the molecular weight distribution. Polyethylene is partially amorphous and partially crystalline. The percent crystallinity has a marked effect on physical properties. Side chain branching is the key factor controlling the degree of crystallinity. High density polyethylene (HDPE) has fewer side-chain branches than low density polyethylene (LDPE), therefore, a more tightly packed structure and a higher degree of crystallinity can be obtained. HDPE is characterized as being a highly crystalline material, perhaps as much as 85% while LPED exhibits crystallinities as low as 50%. The amount of branching is controlled in the LDPE and HBPE processes in order to adjust crystallinity and physical properties.

The density of polyethylene affects many physical properties. In general, increasing density increases stiffness, tensile strength, hardness, heat and chemical resistance, opacity and barrier properties, but reduces impact strength and stress-crack resistance.

As used in this application, low density polyethylene will mean an ethylene polymer which has a specific gravity of about 0.89 to 0.915, a tensile strength of about 1,500 psi; an impact strength over 10 ft-lb/in./notch; a thermal expansion of $17 \times 10^{-5}$ in/in/° C. When discussing high density polyethylene, an ethylene polymer which has a specific gravity of about 0.94 to 0.95, a tensile strength of about 4,000 psi; impact strength of 8 ft-lb/in/notch. It is of course recognized, that it is possible to use materials which are a blend of various polyethylenes or other compatible materials in many different ratios. When discussing crosslinked polyethylene, an ethylene polymer, either low or high density, will be intended wherein the polymer has been either exposed to radiation with electron beam or gamma rays, crosslinking taking place through a primary valence bond, or by chemical crosslinking means, such as by using an organic peroxide, or by using silane. The range of crosslinking can be as low as from 30% to 90% or higher.

Crosslinking can of course, be accomplished in many different ways. Crosslinking can be performed during the extrusion process, e.g., by the Engel process, or post-extrusion, e.g., by a silane process or a peroxide process or combinations thereof wherein some crosslinking occurs during the extrusion step and is completed in a hot bath post-extrusion step. Each process has a crosslinking catalyst that causes the polymer to crosslink when certain temperature and pressure and/or humidity are used. One additional way to crosslink is to use radiation. In this method, extruded tubes are passed under a radiation unit and the exposure causes crosslinking. It usually is more economical to radiate straight tubes since the economics revolve around how many parts will fit on a cart that rolls under the beam. However, this does not represent the only embodiment contemplated within the invention. It is envisioned that under some circumstances, it would be appropriate to crosslink the final product.

Figure 3:
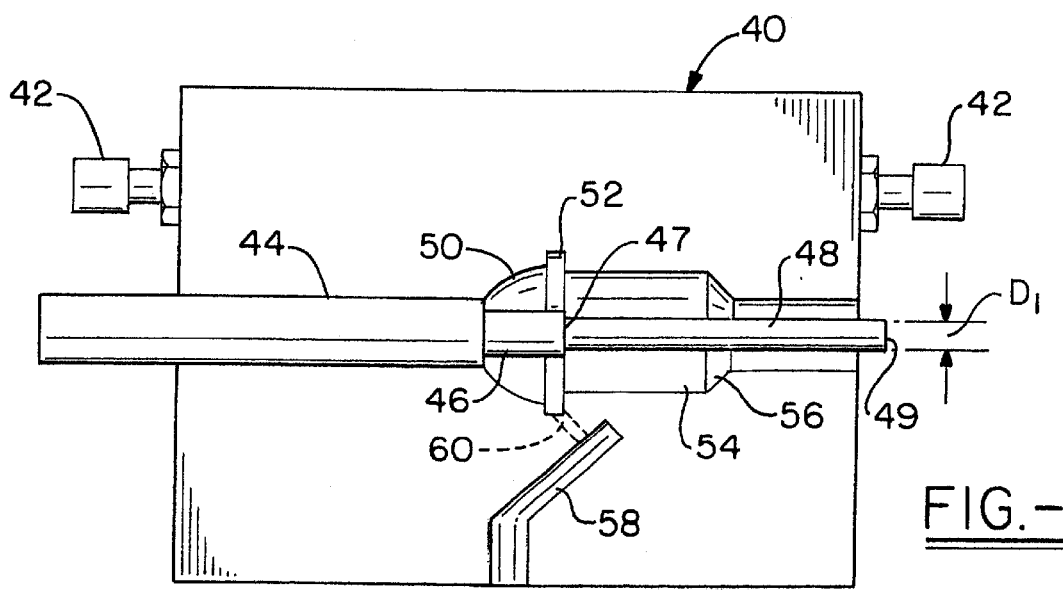
FIG. 3 is a top view of one half of a mold used in the process of overmolding a nose cone onto a plastic tube.

FIG. 3 shows one half of a mold 40 which would be effective in the overmolding process. The mold comprises a mandrel 44 having extending portions 46, 48 and terminating at a point outside the mold 40. It is not necessary that the mandrel extending portion have two different diameters as shown in FIG. 3, although this is preferred. At least a portion of the extending mandrel will have an outer diameter which essentially matches the inner diameter of the plastic tube, to permit the insertion of the tube onto the extending portion of the mandrel. The mold will have a radiused or conical base 50 which will form the sealing surface of the nose cone terminating in a mold shelf recess 52. Cylindrical mold portion 54 extends from this shelf recess and terminates in radiused mold portion 56. Overmolding feed conduit 58 is used to transfer flowable polymer from a source (not shown) into mold 40 via transfer conduit 60 shown in the Figure to be at the location of mold shelf recess 52, although there is no reason to limit the location to this point, other entry points being satisfactory depending upon design criterion and location of the parison. Connectors 42 are used for heating and optionally cooling of the mold.

Figure 4:
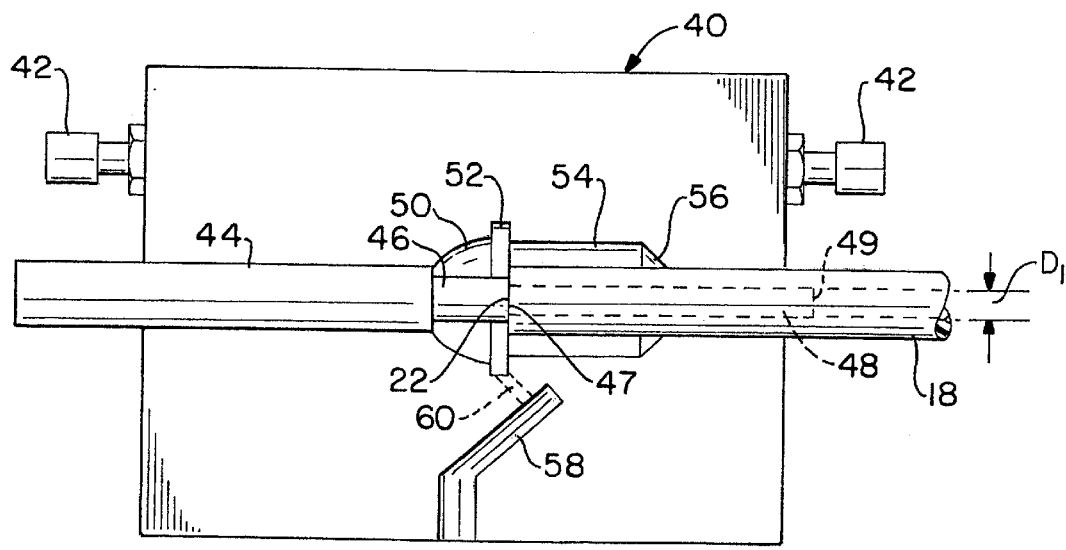
FIG. 4 is a view similar to FIG. 3 showing the plastic tube inserted over the mandrel in the mold.
Figure 5:
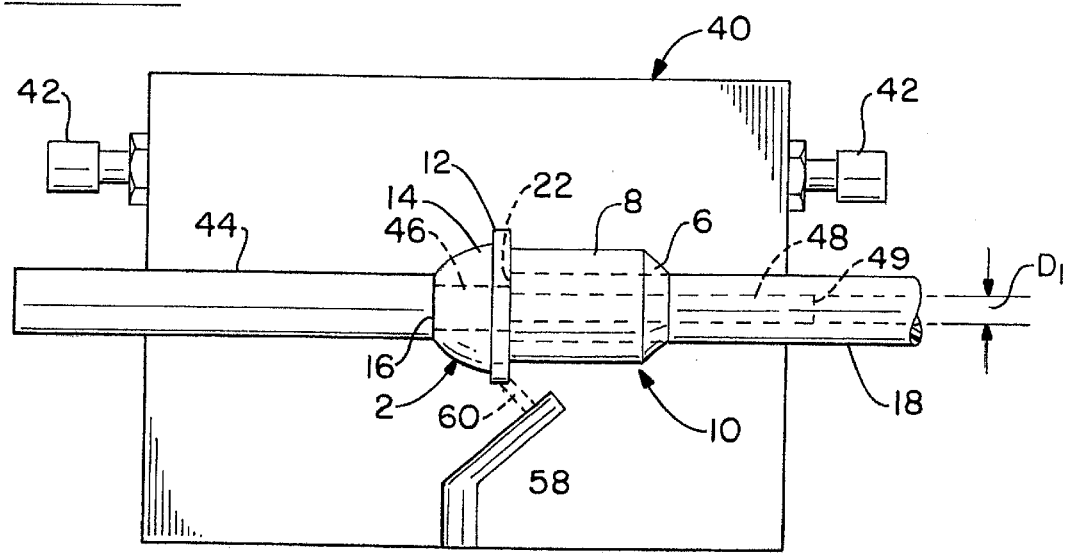
FIG. 5 is a view similar to FIG. 4 with the nose cone shown overmolded onto the plastic tube.

FIG. 4 shows the positioning of the plastic tube 18 onto the extending portion 48 of the mandrel 44 terminating at the terminal shelf 47 of the first larger extending portion 46 of the mandrel 44 while FIG. 5 shows the product after the overmolding process has been completed. It should be recognized that the precise location of the first terminal shelf 47 of the first extending portion 46 of the mandrel 44 need not coincide with the location of nose cone shelf 12, although it often will be in the vicinity thereof In some instances, the extending mandrel portion will only be the second smaller diametered section, and the first extending portion will be eliminated completely.

In operation, the mold cycle times and temperatures used will be dependent upon the composition of the materials used and the geometry of the part(s) being molded as well as the degree of dimensional control required for the molded product. It is possible to have a cycle time range from five seconds to several minutes depending on the curing time for the molded material. In general for crosslinked polyethylene tubing, the temperatures used will range from 350° F. melt up to 540° F. although similar operations variables which were discussed for the mold cycle time are equally applicable here. Molding pressure will also be subject to similar considerations, and for crosslinked polyethylene, can range from 200 psi to 2,000 psi (hydraulic). In general, the colder the melt, the higher the pressure which is required to fill and pack the mold. If the part which is to be molded has a very thick section, then it may be desirable to use a low melt temperature, high melt pressure and as low a cycle time as possible. Given the interactivity between the above variables in an injection molding process, the range of the processing variables is almost limitless within broad guidelines and within the skill of those in the art.

Figure 6:
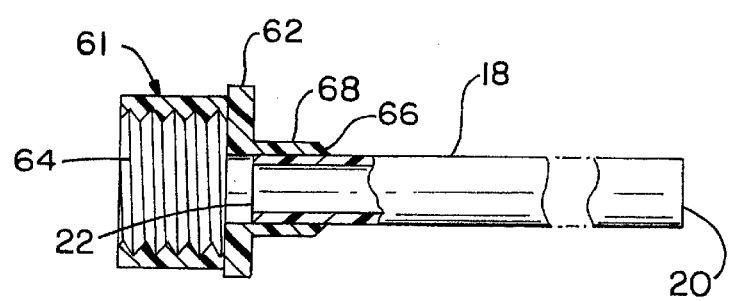
FIG. 6 is a side view shown in partial cross-section of an overmolded nut.

While the above discussion has focused attention on the overmolding of a nose cone, there is no need to limit the invention to such. In fact, as shown in FIG. 6, an overmolded nut is shown, said nut having been formed by analogus processing to that described previously for nose cones. The overmolded nut 61 is shown affixed to tube 18, the nut containing a threaded bore 64 and a shoulder 62. The inner surfaces of the barrel portion 68 and radiused taper 66 are used to affix the nut in a leak-proof manner to the corresponding section of the outer surface of tubing element 18. This nut in a preferred embodiment will be glass-filled polyethylene and will optionally incorporate an "O" ring to seal. In this configuration, it is obviously recognized that the tube would turn while screwing the riser into place.

Figure 8:
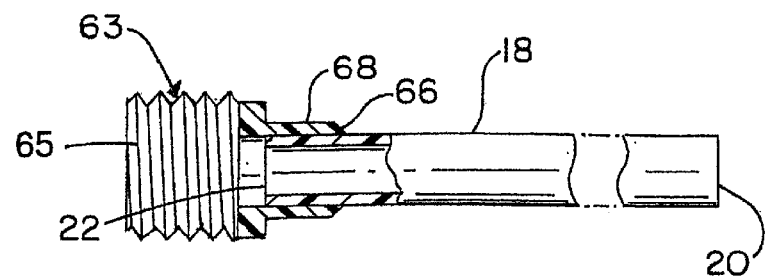
FIG. 8 is a side view shown in partial cross-section of an overmolded threaded connector.

Yet another variation, an overmolded threaded connector, is shown in FIG. 8, , which is similar to that shown and described previously with reference to FIG. 6, where an overmolded nut was shown. The threaded connector is formed by analogous processing to that described previously for nose cones, the mold design being different. The overmolded threaded connector 63 is shown affixed to tube 18, the connector being threaded 65 and having a shoulder 62. The inner surfaces of the barrel portion 68 and radiused taper 66 are used to affix the nut in a leak-proof manner to the corresponding section of the outer surface of tubing element 18. This threaded connector in a preferred embodiment will be glass-filled polyethylene.

Figure 7:
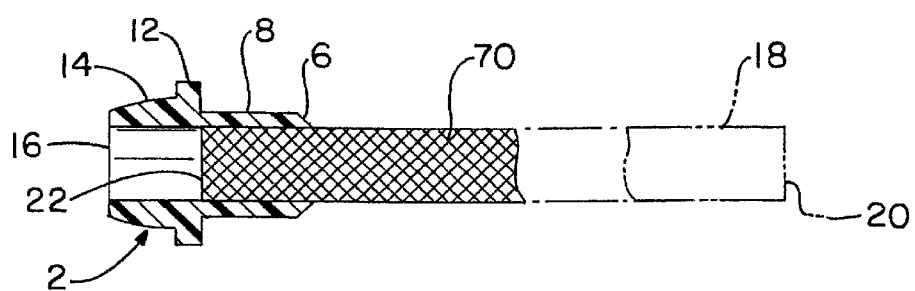
FIG. 7 is a view similar to FIG. 1 showing the nose cone in cross-section and the tube having an overbraid.

In FIG. 7, yet another embodiment of this invention is shown wherein an overbraid 70 has been applied to the tube prior to the overmolding process. The overbraiding could be fiberglass, nylon webbing, stainless steel, etc.

Discussion

What has been described above, is a process for overmolding tubes which comprises the steps of inserting a tube of a first polymer having an inner diameter at least partially into a mold and at least partially onto a cylindrical mandrel, the mandrel having a base and a tip, an outer diameter of said mandrel dimensioned to allow the inner diameter of the tube to slide thereon and forming in one embodiment, a sealing surface thereupon. The mold, which is a split mold, will contain by necessity, a void which comprises a sealing surface region at a base of the mandrel and a tube contacting region adjacent the sealing surface region. A second polymer is injection molded over the first polymer tube and the mandrel in the void of the mold and the polymers are crosslinked by using any of the crosslinking methodologies well known in the art.

In a preferred embodiment, the first and second polymers are polyethylene and independently crosslinked to an initial degree and wherein the step of crosslinking independently increases the degree of crosslinking to a second higher final amount. The density of the polymers will impact the degree of flexibility of the product, and by using the process described, it is possible to tailor the characteristics of the final product. In one aspect of the invention, the initial degree of crosslinking of the first and second polymers is independently less than 50% and the final degree of crosslinking of the first and second polymers is independently greater than or equal to about 50%. In another aspect of the invention, the initial degree of crosslinking of the first and second polymers is independently less than or equal to about 40% and the final degree of crosslinking of the first and second polymers is independently greater than or equal to about 50%. In yet another aspect of this invention, the initial degree of crosslinking of the first and second polymers is independently less than or equal to about 35% and the final degree of crosslinking of the first and second polymers is independently greater than or equal to about 50%. When it is desired that the tube be flexible and the nose cone by more rigid, then the density of the first polymer will be less than the density of the second polymer.

As seen in the Figures, the sealing surface region is selected from the group consisting of a cup-shaped void and a radiused void and the tube contacting region is an essentially tubular void. In a more preferred embodiment, an annular shelf is interposed between the sealing surface region and the tube contacting region. In one aspect of the invention, the tube polymer will be overbraided with a mesh, the mesh being either a woven or open mesh.

At times, it may be desirable to insert a nut onto the first polymer after the step of injection molding. Optionally, it is possible to mold a retaining ring onto the first polymer tube by heating a region posterior of the nut until it becomes soft, and at least one end of the tube is compressed along a longitudinal axis of the tube, such as described in U.S. Pat. No. 4,803,033, the teachings of which are hereinby fully incorporated by reference. As taught in the patent, the tube is preheated at a precise area and grippping dies are used to compress the heated area. Upon compression, the heated area is forced to bulge out and fold to form the flange or bellows. A mandrel is inserted into the tube prior to the compression to insure that the tube bulges outwardly.

In another embodiment of this invention, it is possible to evermold a nut or a threaded connector over one end of the tube, rather than the sealing surface discussed previously. The process involves the same steps with the essential difference being in the mold design, which would contain a void which comprises an internally threaded engaging surface region at a base of the mandrel. In a preferred embodiment, an n-sided shelf is interposed between the internally threaded engaging surface region and the tube contacting region and n is an integer value greater than or equal to 4.

The best mode for carrying out the invention has been described for the purposes of illustrating the best mode known to the applicant at the time. The examples are illustrative only and not meant to limit the invention, as measured by the scope and spirit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process for overmolding tubes comprising the steps of:

inserting a tube of a first polymer, having an inner diameter, at least partially into a mold and at least partially onto a cylindrical mandrel, the mandrel having a base and a tip, an outer diameter of said mandrel dimensioned so as to allow the inner diameter of the tube to slide thereon, said mold containing a void for receiving a second polymer, the void co-acting with the mandrel and the tube to define an overmolding shape;

injection molding the second polymer over the tube and the mandrel in the void of the mold; and crosslinking the first and second polymers independently to an initial degree, and independently crosslinking said polymers to a higher final degree.

2. The process of claim 1 wherein the overmolding shape comprises a sealing surface region at the base of the mandrel and a tube contacting region adjacent thereto.

3. The process of claim 1 wherein the overmolding shape comprises an internally threaded engaging surface region at the base of the mandrel and a tube contacting region adjacent thereto.

4. The process of claim 1 wherein the overmolding shape comprises an externally threaded engaging surface region at the base of the mandrel and a tube contacting region adjacent thereto.

5. The process of claim 1 wherein the first and second polymers are polyethylene.

6. The process of claim 5 wherein an initial degree of crosslinking of each of the first and second polymers is in the range of from about 35% to about 50% and the final degree of crosslinking of each of the first and second polymers is greater than or equal to about 50%.

7. The process of claim 2 wherein the sealing surface region is selected from the group consisting of a cup-shaped void and a radiused void; and wherein the tube contacting region is an essentially tubular void.

8. The process of claim 7 wherein the tube further comprises an annular shelf interposed between the sealing surface region and the tube contacting region.

9. The process of claim 3 wherein the internally threaded engaging surface region is an internally threaded annular void; and wherein the tube contacting region is an essentially tubular void.

10. The process of claim 9 wherein the tube further comprises an n-sided shelf interposed between the internally threaded engaging surface region and the tube contacting region and wherein n is an integer value greater than or equal to 4.

11. The process of claim 4 wherein the externally threaded engaging surface region is a threaded annular void; and wherein the tube contacting region is an essentially tubular void.

12. The process of claim 11 wherein the tube further comprises an n-sided shelf interposed between the externally threaded engaging surface region and the tube contacting region and wherein n is an integer value greater than or equal to 4.

13. The process of claim 1 wherein the tube further comprises a mesh overbraid applied prior to the injection molding step.

14. The process of claim 2 which further comprises the step of inserting a nut onto the tube after the step of injection molding.

15. The process of claim 2 which further comprises the step of molding a retaining ring onto the first polymer tube by heating a portion of the tube posterior to the nut and compressing at least one end of the tube along a longitudinal axis of the tube, a mandrel having been inserted into the tube prior to the step of compressing.

16. The process of claim 5 wherein
the first polymer is a high density polyethylene and
the second polymer is a low density polyethylene.

17. The process of claim 5 wherein
the first polymer is a low density polyethylene and
the second polymer is a high density polyethylene.

18. The process of claim 1 wherein
at least one of the first and second polymers is at least partially crosslinked before the step of crosslinking.

19. The process of claim 1 wherein
an initial degree of crosslinking of the first polymer is less than an initial degree of crosslinking of the second polymer.

20. A process for overmolding tubes comprising the steps of:
inserting a tube of a first polymer having a first polymer initial degree of crosslinking, said first polymer having an inner diameter, at least partially into a mold and at least partially onto a cylindrical mandrel, the mandrel having a base and a tip, an outer diameter of said mandrel dimensioned so as to allow the inner diameter of the tube to slide thereon, said mold containing a void for receiving a second polymer, the void co-acting with the mandrel and the tube to define an overmolding shape;
injection molding a second polymer having a second polymer initial degree of crosslinking, said initial degrees of crosslinking being selected independently for the first and second polymers, over the tube and the mandrel in the void of the mold; and
crosslinking the first and second polymers to a final degree, said final degree of crosslinking for the first and second polymers being selected independently for the first and second polymers.

21. The process of claim 20 wherein
an initial degree of crosslinking of each of the first and second polymers is in the range of from about 35% to about 50% and the final degree of crosslinking of each of the first and second polymers is greater than or equal to about 50%.

22. The process of claim 20 wherein
the first polymer is a high density polyethylene and
the second polymer is a low density polyethylene.

23. The process of claim 20 wherein
the first polymer is a low density polyethylene and
the second polymer is a high density polyethylene.

24. The process of claim 20 wherein
an initial degree of crosslinking of the first polymer is less than an initial degree of crosslinking of the second polymer.

25. The process of claim 20 wherein
the overmolding shape comprises
a sealing surface region at the base of the mandrel and
a tube contacting region adjacent thereto.

26. The process of claim 20 wherein
the overmolding shape comprises an internally threaded engaging surface region at the base of the mandrel and
a tube contacting region adjacent thereto.

27. The process of claim 20 wherein
the overmolding shape comprises an externally threaded engaging surface region at the base of the mandrel and
a tube contacting region adjacent thereto.

28. The process of claim 20 wherein
the first and second polymers are polyethylene.

29. The process of claim 28 wherein
an initial degree of crosslinking of each of the first and second polymers is in the range of from about 35% to about 50% and the final degree of crosslinking of each of the first and second polymers is greater than or equal to about 50%.

30. The process of claim 25 wherein
the sealing surface region is selected from the group consisting of a cup-shaped void and a radiused void; and wherein
the tube contacting region is an essentially tubular void.

31. The process of claim 30 wherein
the tube further comprises an annular shelf interposed between the sealing surface region and the tube contacting region.

32. The process of claim 26 wherein
the internally threaded engaging surface region is an internally threaded annular void; and wherein
the tube contacting region is an essentially tubular void.

33. The process of claim 32 wherein
the tube further comprises a n-sided shelf interposed between the internally threaded engaging surface region and
the tube contacting region and wherein n is an integer value greater than or equal to 4.

34. The process of claim 28 wherein the externally threaded engaging surface region is a threaded annular void; and wherein the tube contacting region is an essentially tubular void.

35. The process of claim 34 wherein the tube further comprises a n-sided shelf interposed between the externally threaded engaging surface and the tube contacting region and wherein n is an integer value greater than or equal to 4.

36. The process of claim 20 wherein the tube further comprises a mesh overbraid applied prior to the injection molding step.

37. The process of claim 20 which further comprises the step of inserting a nut onto the tube after the step of injection molding.

38. The process of claim 20 which further comprises the step of molding a retaining ring onto the first polymer tube by heating a portion of the tube posterior to the nut and compressing at least one end of the tube along a longitudinal axis of the tube, a mandrel having been inserted into the tube prior to the step of compressing.

39. The process of claim 20 wherein at least one of the first and second polymers is at least partially crosslinked before the step of crosslinking.

40. The process of claim 21 wherein an initial degree of crosslinking of the first polymer is less than an initial degree of crosslinking of the second polymer.

\* \* \* \* \*